United States Patent [19] [11] 4,066,178
Carson [45] Jan. 3, 1978

[54] CONTAINER-DUMPING APPARATUS

[76] Inventor: William S. Carson, 218 Escambia Drive, Winter Haven, Fla. 33880

[21] Appl. No.: 707,376

[22] Filed: July 21, 1976

[51] Int. Cl.[2] ........ B65G 65/04

[52] U.S. Cl. ........ 214/313; 214/147 G; 294/90; 294/104

[58] Field of Search ........ 214/302, 147 G, 313, 214/654; 294/90, 67 DA, 104

[56] References Cited

U.S. PATENT DOCUMENTS

| | | | |
|---|---|---|---|
| 2,712,878 | 7/1955 | Sutton et al. | 214/313 |
| 2,981,424 | 4/1961 | Petersen et al. | 212/41 |
| 3,039,631 | 6/1962 | Baker | 214/313 |
| 3,119,505 | 1/1964 | Petersen et al. | 294/68 |
| 3,447,705 | 6/1969 | Stone | 214/302 |
| 3,618,800 | 11/1971 | Collins et al. | 214/313 |
| 3,858,735 | 1/1975 | Zrostlik | 214/332 |
| 3,915,488 | 10/1975 | Anderson | 294/90 |

*Primary Examiner*—Lawrence J. Oresky

[57] ABSTRACT

A pick-up assembly is provided for attachment to a hydraulically operated lift device for picking up and dumping containers. The pick-up assembly includes three arms which are provided with container-engaging hooks for engaging the container at three positions around the periphery thereof. At least one of the hooks is movably mounted to permit the hook to be moved into position to engage the container when the lift device is to be raised. The arms are supported by a first shaft which is rotatably connected to a second shaft, and the second shaft is pivotally connected to the lift device for pivoting movement about a horizontal axis to permit the arms to swing in a generally horizontal plane when the first and second shafts extend generally vertically. A bell crank is pivotally mounted on the lift device and is engageable with one of the shafts for pivoting the pick-up assembly about the horizontal pivot connection between the second shaft and the lift device to thereby dump the contents of the container.

12 Claims, 6 Drawing Figures

CONTAINER-DUMPING APPARATUS

BACKGROUND

This invention relates to a container lifting and dumping apparatus which is particularly suitable for use in the citrus industry.

In the citrus industry oranges, grapefruit, and the like are picked from trees and placed in a container near the tree. When the container is filled, it may either be emptied into a larger container carried by a truck at the picking site or the container may be transported to the edge of the grove where it is emptied into a large semi-trailer truck body or the like. Two types of apparatus for emptying the contents of the container into the container body of a truck at the picking site are illustrated in U.S. Pat. Nos. 2,981,424 and 3,618,800.

The apparatus described in U.S. Pat. No. 2,981,424 requires the use of baskets having a hinged bottom. However, since containers without hinged bottoms are frequently used in citrus groves, it is desirable to provide an apparatus for emptying the contents of these containers.

The apparatus described in U.S. Pat. No. 3,618,800 includes a lift bar which is lowered across the container and a clamping assembly on each end of the bar which is movable into engagement with the container on opposite sides thereof. The apparatus shown in this patent was described in conjunction with a wooden pallet box, but this apparatus as well as other pick-up assemblies available in the citrus industry can be used with frustoconical tubs. The advantage of such tubs is that empty tubs can be stacked by nesting the tubs. Such tubs generally include an outwardly extending upper rim or flange which is engageable with the clamping assemblies of the pick-up assembly.

The problem with such pick-up assemblies is that the clamping assemblies engage the circular periphery of the tub at diametrically opposed locations. The operator of the lift device sometimes experiences difficulty in centering the clamping assemblies with respect to the tub, and the clamping assemblies frequently squeeze the tub excessively and cause permanent deformation or damage to the tub.

SUMMARY

The inventive pick-up assembly includes three arms rather than two so that the container is not engaged at diametrically opposed locations. The arms are rotatable about three mutually perpendicular axes to facilitate proper alignment of the arms relative to the periphery of the container and to permit the arms to engage the container even when the container is resting on an irregular surface. The pick-up assembly is advanced toward the container by the lift device, and if only one of the arms engages the container, the pick-up assembly will rotate to bring a second arm into engagement with the container. The third arm will then be positioned over the container along a diameter which extends equidistant between the first two arms. The third arm includes a movable hook which can be moved into position to engage the upper rim of the container when the pick-up assembly is raised by the lift device without squeezing the container. The pick-up assembly is connected to the lift device by a centering device which biases the arms to rotate in a horizontal plane toward a centered position relative to the lift device when the container is lifted from the ground or released to facilitate engaging the arms with the container and to permit the container to be dumped when it is raised by the lift device.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
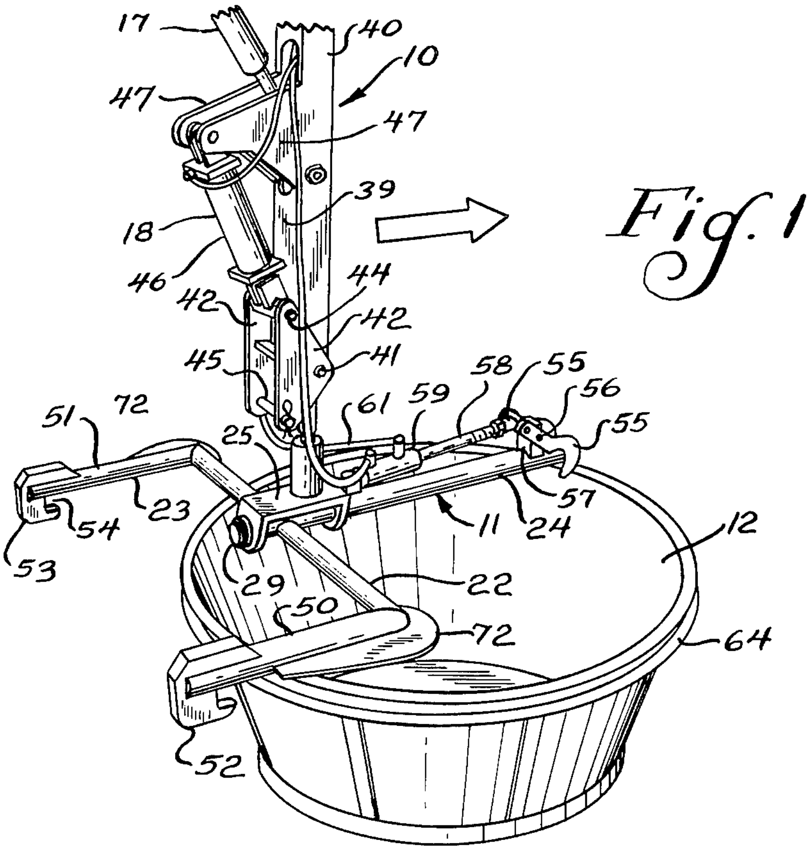
FIG. 1 is a fragmentary perspective view of a lifting device equipped with the inventive pick-up apparatus showing the pick-up apparatus being moved into position to engage a container.
Figure 2:
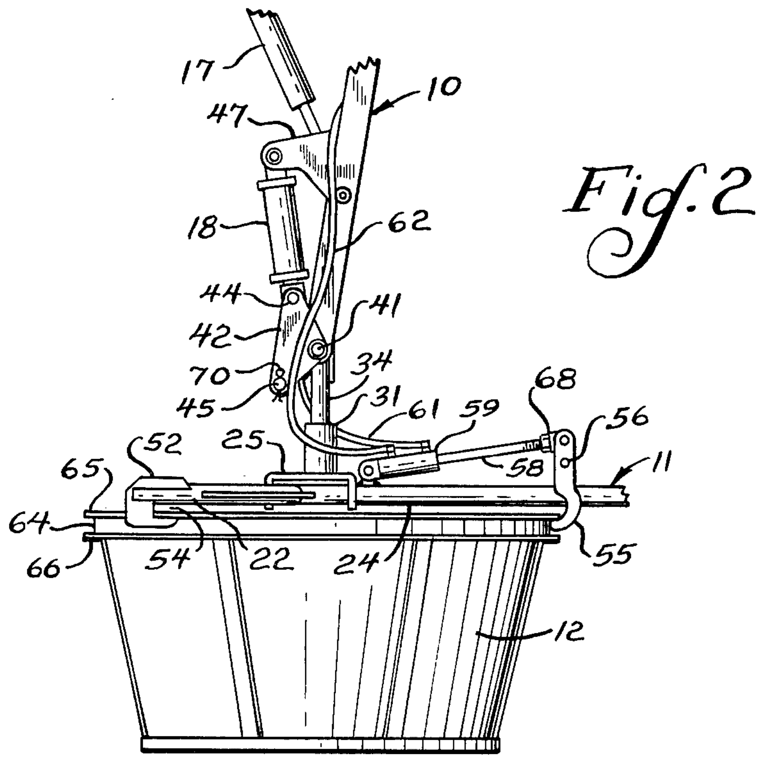
FIG. 2 is a fragmentary elevational view showing the pick-up apparatus in position to lift the container.
Figure 3:
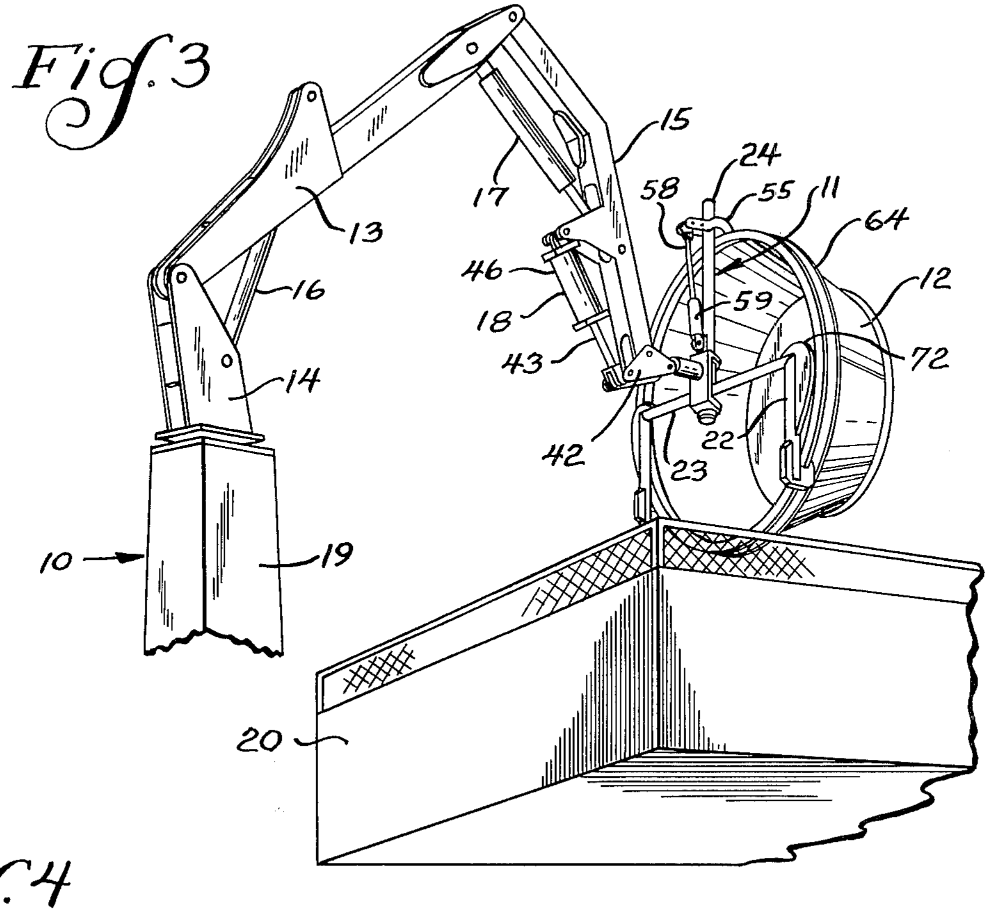
FIG. 3 is a fragmentary perspective view showing the container being dumped.

Referring to FIGS. 1–3, a lift device 10 carries a pick-up assembly designated generally by the numeral 11 which is engageable with a container 12. The lift device 10 is a hydraulically operated two-part boom of the type which is commonly used in the citrus industry as well as other industries. Since this type of lift device is well known to those skilled in the art, it is believed that only a brief description is necessary. The lift device 10 includes a primary boom 13 (FIG. 3), which is pivotally supported by a base 14, and a secondary or tip boom 15 which is pivotally mounted on the end of the primary boom. A hydraulically operated cylinder and piston assembly 16 is connected to the base 14 and the primary boom 13 and permits the primary boom to be raised and lowered. Another hydraulically operated cylinder and piston assembly 17 is connected to the primary boom and the secondary boom for pivoting the secondary boom about the end of the primary boom. Still another hydraulically operated cylinder and piston assembly 18 is connected to the secondary boom for pivoting the pick-up assembly. The base 14 is rotatably supported by a mast or pedestal 19, and suitable power means may be provided within the mast for rotating the base 14.

As will be described more fully hereinafter, the lift device 10 is operated to position the pick-up assembly 11 above the container 12 which is to be dumped, the pick-up assembly is then operated to engage the container, and the lift device 10 is operated to raise the container over the container body 20 of a truck. Thereafter, the cylinder and piston assembly is operated to pivot the pick-up assembly and the container to tilt the container and empty the contents thereof into the truck body 20 as illustrated in FIG. 3.

Referring now to FIG. 1, the pick-up assembly 11 includes a pair of L-shaped arms 22 and 23 which extend in opposite directions from a third arm 24. The three arms 22–24 lie in the same plane and are supported for pivoting movement about the longitudinal axis of the arm 24 by a clevis 25. As can be seen best in FIG. 4, the clevis includes a flat central plate 26 and a pair of downwardly extending lug portions 27 and 28 through which the arm 24 extends. The arm 24 shown in the specific embodiment illustrated is a solid rod, and an annular end cap 29 is welded to the end of the rod to prevent its withdrawal from the lug 27.

Figure 4:
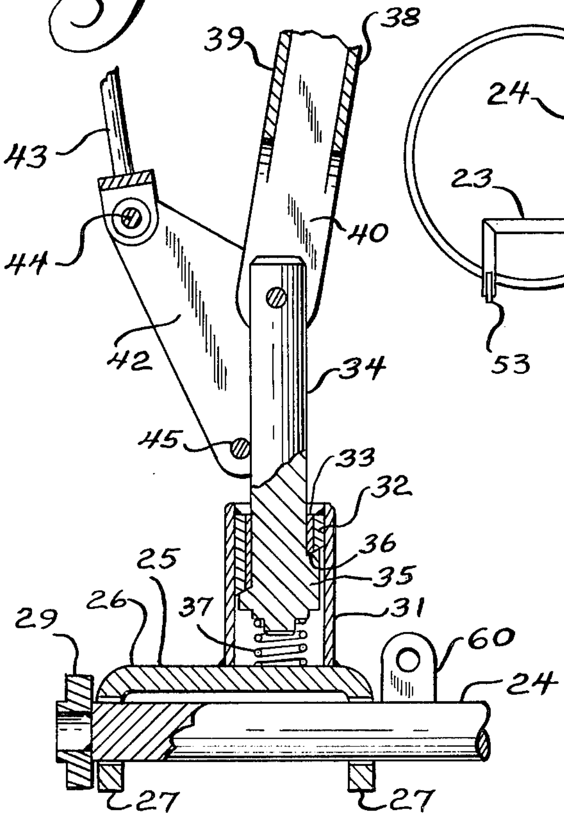
FIG. 4 is an enlarged fragmentary elevational sectional view of the central portion of the pick-up apparatus.

Still referring to FIG. 4, a cylindrical casing or shaft 31 is welded to the clevis 25, and a cylindrical sleeve 32 and a cylindrical bushing 33 are secured within the upper end of the casing. Both the sleeve 32 and the bushing 33 have an inclined lower cam face. A shaft 34 extends through the bushing 33 and includes a radially enlarged head 35. The head 35 is provided with an inclined cam surface 36 which extends outwardly from the shaft 34 and which is engageable with the lower cam faces of the sleeve 32 and bushing 33. The cam surface 36 of the head 33 is biased against the cam surfaces of the sleeve and bushing by a coil spring 37.

The cam surfaces of the head 35 and the sleeve 32 and bushing 33 act as a centering means for the pick-up assembly in the same way as the centering means described in U.S. Pat. No. 3,119,505. When the arms and the casing 31 rotate in either direction about the shaft 34 from the position illustrated in FIGS. 1 and 4, the lower cam surfaces of the sleeve 32 and bushing 33 will ride up on the inclined cam surface 36 of the head 35. When the force causing the arms to rotate is removed, the weight of the arms will cause the arms to rotate back to their original position to permit the lower inclined cam surfaces of the sleeve and bushing to ride down the inclined cam surface 36 of the head 35. This return or centering action is increased by the spring 37, which is compressed when the cam surfaces of the sleeve and bushing ride up on the inclined cam surface 36.

The secondary boom 15 has a generally rectangular transverse cross section formed by front and rear walls 38 and 39 and a pair of side walls 40. The side walls 40 extend beyond the lower end of the front and rear walls 38 and 39 to provide the lower end of the secondary boom with a bifurcated end. The shaft 34 is pivotally connected to the bifurcated end of the secondary boom by a pin 41 which extends between the side walls 40.

The pick-up assembly can be pivoted about the pivot pin 41 by a bell crank 42 which is operated by piston 43 of the cylinder and piston assembly 18. The bell crank 42 is provided by a pair of triangularly shaped plates which are pivotally mounted outwardly of the side walls 40 of the secondary boom on the pivot pin 41. The piston 43 is pivotally connected to the bell crank plates by a pin 44 which extends between the plates, and a pin 45 which extends between the lower ends of the bell crank plates is engageable with the shaft 34 when the piston 43 is extended from the cylinder 46. The upper end of the cylinder 46 is pivotally connected between a pair of support brackets 47 which extend rearwardly from the secondary boom.

Referring again to FIG. 1, the arms 22 and 23 include rearwardly extending end portions 50 and 51, respectively, and C-shaped hooks 52 and 53 are mounted on the ends thereof. Each of the hooks includes a recess or opening 54 which opens in the direction in which the third arm 24 extends from the clevis.

A pair of hooks 55 are pivotally mounted on a pin 56 which is supported by a lug 57 on the forward end of the arm 24. The hooks are pivoted by a piston 58 which is actuated by a hydraulic cylinder 59 which is pivotally secured to a lug 60 (FIG. 4) on the arm. The cylinder 59 is a double acting hydraulic cylinder, and hydraulic fluid is supplied thereto by hoses 61 and 62. The other cylinders are also double acting, but the hydraulic hoses have been omitted for clarity of illustration.

The pick-up assembly is operated by lowering the lift device until the hooks 52 and 53 on the rearwardly extending end portions 50 and 51 of the arms 22 and 23 are in position to engage the container 12. The container 12 illustrated in the drawings is a frusto-conically shaped tub, and the upper end of the tub is formed by a circularly extending channel 64 having upper and lower flanges 65 and 66 (FIG. 2). In the preferred embodiment, the arms 22 and 23 were tubular, and the end portions 50 and 51 thereof were weighted with lead so that the pick-up assembly would pivot about the pivot connection 41 to the secondary boom to position the rear hooks 52 and 53 below the forward hook 55. The rear hooks 52 and 53 could then be moved to engage the channel 64 on the tub merely by advancing the secondary boom forwardly in the direction of the arrow in FIG. 1. The forward arm 24 would be inclined upwardly from the horizontal, and the forward hook 55 would pass over the channel. When the hooks 52 and 53 are positioned between the upper and lower flanges of the channel, the lift device is lowered to pivot the forward arm 24 downwardly about the pivot connection 41 against the tub, and the hydraulic cylinder 59 is then operated to extend the piston 58 and to pivot the lower end of the hook 55 below the upper flange 65 of the channel. The lift device can then be raised by extending the cylinder and piston assembly 16. When the tub is positioned over the container body 20 shown in FIG. 3, the contents of the tub can be dumped by operating the cylinder 46 to extend the piston 43. The bell crank 42 is thereby pivoted about the pivot pin 41, and the abutment pin 45 carried by the bell crank engages the shaft 34 which connects the pick-up arms 22–24 to the lift device. The piston 43 is extended until the pick-up assembly lift device. The piston 43 is extended until the pick-up assembly and the tub are pivoted to the position illustrated in FIG. 3, which permits the contents of the tub to fall into the container body 20.

When the tub is emptied, the cylinder 46 can be actuated to retract the piston 43, and the pick-up assembly will pivot downwardly to its original position under the influence of gravity. The lift device can then be lowered to lower the tub to the ground. The pick-up assembly is detached from the tub by operating the cylinder 59 to retract the piston 58 and to pivot the hook 55 out of engagement with the channel on the tub.

The two rear hooks 52 and 53 of the pick-up assembly are spaced apart a distance less then the diameter of the tub and engage the channel at two spaced-apart locations along the periphery thereof. The front hooks 55 engage the channel at a third location. Since the weight of the tub during dumping will be substantially supported by the two spaced-apart hooks 52 and 53, the hooks 55 need not squeeze the channel between themselves and the other two hooks 52 and 53. All that is necessary is that the lower ends of the hooks 55 pivot inwardly a sufficient distance to insure that all of the hooks will engage the upper flange 65 of the channel when the pick-up assembly is raised. In order to insure that the channel is not squeezed by the hydraulically operated hooks 55, the hooks 55 are connected to the piston 58 by an adjusting nut 68 (FIG. 2) which is threadedly engaged with external threads on the ends of the piston. Movement of the nut thereby adjusts the positions of the hooks.

Figure 5:
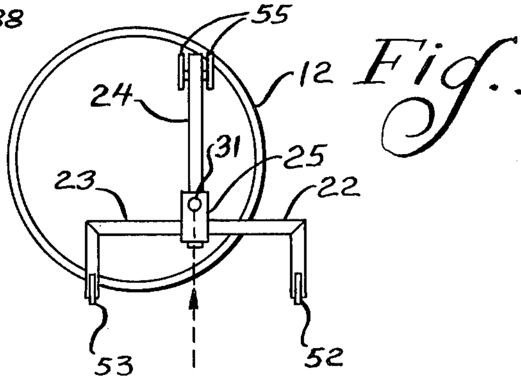
FIGS. 5 and 6 are top plan views illustrating how the pick-up apparatus can rotate to bring all three arms of the pick-up apparatus into position to engage the container.
Figure 6:
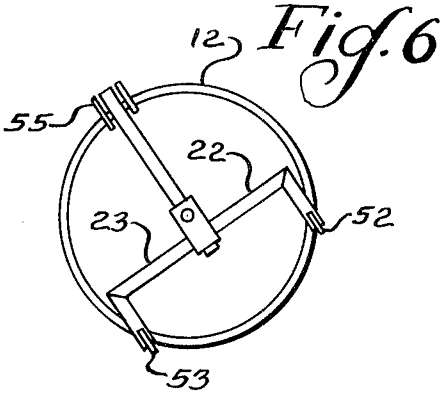

FIGS. 5 and 6 illustrate the manner in which the pick-up apparatus can be engaged with the tub even when the pick-up apparatus is not centered with respect to the tub as the lift device advances the pick-up apparatus toward the tub. The hook 53 on the arm 23 will engage the channel of the tub first, and as the casing 31 and clevis 25 continue to be advanced by the lift device in the direction of the arrow, the arms will rotate counterclockwise with respect to the connecting shaft 34 until the hook 52 on the arm 22 is brought into engagement with the channel of the tub. The end portions 50 and 51 of the arms 22 and 23 are shorter than the arm 24, and rotation of the arms about the axis through the shaft 34 will bring the hook 52 into engagement with the channel if the pick-up apparatus is not too far off-center relative to the container, i.e., if the distance of the shaft 34 from the center of the container in the direction perpendicular to the direction in which the pick-up apparatus is advanced is no greater than the distance between the shaft and the center of the container when all three arms are engaged with the container. Rotation of the pick-up assembly as the lift device is advanced will bring the pick-up assembly into the position illustrated in FIG. 6, and the hooks 55 are then in position to pivot into engagement with the channel of the tube when the piston 58 is actuated. The tub can be lifted by actuating the piston 58 and then raising the lift device.

When the pick-up assembly rotates from the position of FIG. 5 to the position of FIG. 6, the lower inclined cam faces of the sleeve 32 and bushing 33 within the casing 31 ride up on the upper inclined face 36 of the shaft 34. As soon as the container is lifted from the ground, the weight of the container and the pick-up assembly will cause the sleeve 32 and bushing 33 to ride back down the inclined cam surface 36, and the pick-up assembly will rotate back to its original position shown in FIG. 5. The pick-up assembly will therefore automatically be returned to its centered position so that the container can be dumped by actuating the piston 43 which operates the bell crank. The centering means thus not only insures that the pick-up apparatus will be in the proper position to be pivoted about the pivot pin 41 by the bell crank but also insures that the arms will be in the proper position relative to the direction in which the lift device is advanced toward the container. Referring again to FIG. 5, the centering means positions the arms so that the end portions of the arms 22 and 23 extend opposite to the direction in which the lift device is advanced and parallel to the direction of advance. This provides maximum spacing of the hooks 52 and 53 in a direction transverse to the direction of advance and facilitates engagement of the hooks with the channel of the container.

When a container is supported on an incline which slants from right to left or left to right relative to the direction in which the lift device is advanced, the pick-up apparatus is advanced toward the container by the lift device until one of the hooks 52 or 53 engages the channel of the tub. The lift device is then lowered to lower the casing 31 and clevis 25, and, since the hook which engages the channel is prevented from downward movement by the lower flange 66 of the channel, the arms 22–24 will roll or rotate relative to the clevis about the axis through the arm 24. When the lift device has been lowered sufficiently to align the other hook with the channel, the lift device is again advanced until both of the hooks 52 and 53 are positioned in the channel. The piston 58 is then extended to pivot the hook 55 into the channel, and the lift device can be raised. As soon as the container is lifted from the ground, the arms will rotate about the axis of the arm 24 back to their original position.

The rotatability of the arms about three mutually perpendicular axes permits the hooks to engage the container when the container is supported on any irregular or inclined surface. The arms may roll, pitch, and yaw like an airplane so that all three hooks can be properly positioned. The arms can roll about a generally horizontal axis extending through the arm 24, can pitch about a generally horizontal axis which is perpendicular to the first axis and which extends through the pivot pin 41, and can yaw about a generally vertical axis which extends through the connecting shaft 34. The rolling action permits the hooks 52 and 53 to roll relative to each other to accommodate a right-to-left or left-to-right slant of the container. The pitching action permits the hook 55 to pitch relative to the hooks 52 and 53 to accommodate a front-to-rear or rear-to-front slant. The yawing action permits the three hooks to yaw or rotate about the axis through the connecting shaft 34 to permit the hooks to engage the container even when the hooks 52 and 53 are not properly positioned relative to the container as the hooks are advanced.

At the close of the harvesting day, the containers 12 can be loaded onto a truck and removed from the grove. The pick-up assembly and lift device can be used to load and stack the containers on a truck. When the pick-up apparatus is used for stacking, it is desirable that the shaft 34 extend substantially vertically downwardly regardless of the position of the primary and secondary booms 13 and 15 so that the container can be lowered into and nested with another container. For this purpose the pin 45 is withdrawn from the bell crank plates 42 so that the pin does not engage the shaft 34 and cause the shaft to pivot out of the vertical position. The pin can be removably retained in the bell crank plates by a cotter pin 70 (FIG. 2) or the like.

In the particular embodiment illustrated, each of the arms 22 and 23 is provided with a laterally outwardly extending wing or shield plate 72 (FIGS. 1 and 3). These shield plates are sized to extend between the rearwardly extending end portion of the arm and the periphery of the container to prevent oranges from falling through this space and to funnel the oranges into the opening between the arms. This permits the contents of the container to be dumped from the container in a controlled manner and allows the container body 20 of the truck to be filled uniformly.

While in the foregoing specification a detailed description of a specific embodiment of the invention was set forth for the purpose of illustration, it is to be understood that many of the details hereingiven may be varied considerably by those skilled in the art without departing from the spirit and scope of the invention.

I claim:

1. A pick-up assembly for a container dumping apparatus having a lift device for use in lifting and dumping round containers, the pick-up assembly including:

a. connecting means for connecting the pick-up assembly to the lift device, b. three arms supported by the connecting means and extending therefrom, c. container-engaging means on an end portion of each of the three arms, at least one of the container-engagin g means being movably mounted one the associated arm, the container-engaging means of the three arms being positioned in a circle having substantially the same diameter as the top of the round container and the spacing between each pair of container-engaging means being less than the diameter of the top of the round container, the arms extending from the connecting means in a manner which positions each of the container-engaging means relative to the connecting means so that the included angle between lines drawn from the connecting means to any pair of adjacent container-engaging means is less than 180°, d. means for moving said one container-engaging means relative to the container whereby each of the container-engaging means is maintained in a container-engaging position when the pick-up assembly is raised by the lift device, e. first pivot means for pivoting the three arms about a pitch axis which extends generally horizontally, and f. second pivot means for pivoting the arms about a roll axis which is generally perpendicular to the pitch axis and which is generally horizontal when the plane defined by the container-engaging means of the three arms is generally horizontal, the roll axis being generally aligned with one of the container-engaging means whereby the other two container-engaging means are pivotable above and below said horizontal plane said pick-up assembly further including third pivot means for pivoting the three arms about a yaw axis which is generally perpendicular to both the pitch axis and the roll axis and which extends generally vertically when the plane defined by the container-engaging means of the three arms is generally horizontal whereby the arms can rotate relative to the lift device when the lift device is advanced toward a container and the container-engaging means on only one of the arms engages the container to bring the container-engaging means on the other of the arms into position to engage the container.

2. The pick-up assembly of claim 1 in which the lift device is movable in a vertical plane whereby the pick-up assembly may be advanced toward a container to be lifted and dumped, the third pivot means including centering means for biasing the arms toward a position in which the arm carrying the container-engaging means which is aligned with the roll axis extends generally parallel to said vertical plane.

3. The pick-up assembly of claim 1 in which the third pivot means includes a pair of parallel shafts rotatably connected to each other for rotation about the yaw axis, one of the shafts extending to the first pivot means and the three arms being rotatably connected to the other shaft for rotation about the roll axis.

4. The pick-up assembly of claim 3 in which the second pivot means includes means for rotatably supporting the arm which carries the container-engaging means which is aligned with the roll axis, the other two arms being secured to the rotatably supported arm.

5. The pick-up assembly of claim 1 in which the container-engaging means on two of the arms are spaced an equal distance from the connecting means and the container-engaging means on the third arm is spaced a greater distance from the connecting means.

6. The pick-up assembly of claim 5 in which said one movable container-engaging means is on said third arm.

7. The pick-up assembly of claim 5 in which the container-engaging means which is aligned with the roll axis is on said third arm.

8. The pick-up assembly of claim 1 in which the three arms extend in a plane and form a Y shape.

9. A pick-up assembly for a container-dumping apparatus having a lift device, the pick-up assembly including a. a shaft for pivotally connecting the pick-up assembly to the lift device for pivoting movement about a generally horizontal pitch axis, b. an arm support member rotatably connected to the first shaft for rotation about a yaw axis which extends generally perpendicular to the pitch axis, c. three arms rotatably supported by the arm support member and extending therefrom, the arms being connected to the arm support member for rotation about a roll axis which extends generally perpendicular to both the pitch axis and the yaw axis, one of said arms being aligned in the plane defined by the yaw axis and the roll axis, d. container-engaging means on an end portion of each of the arms for engaging and lifting a container when the pick-up assembly is raised by the lift device, at least one of the container-engaging means being movably mounted on the associated arm end portion, e. the said three arms having a configuration whereby two arms of equal length are connected opposite their respective free ends by a cross member such that the two arms and the cross member form a "C" shape and the third arm extends away from said two arms and is connected to the center of said cross member, the third arm being longer than the length of either of the two arms, f. means for moving said one container-engaging means relative to a container to be lifted and dumped whereby each of the container-engaging means is maintained in a container-engaging position when the pick-up assembly is raised by the lift device, g. the lift device is movable in a vertical plane whereby the pick-up assembly may be advanced toward a container to be lifted and dumped, and centering means connected to the shaft and the arm support member for biasing the rotatable position of the arm support member and the arms toward a position in which said one arm extends generally parallel to said vertical plane whereby the shape of the three arms and the centering means serves to facilitate the positioning of the arms prior to gripping the container.

10. The pick-up assembly of claim 9 including centering means connected to the shaft and the arm support member for biasing the arm support member and the arms toward a position in which said one arm extends generally perpendicular to said pitch axis.

11. The pick-up assembly of claim 9 in which the spacing of the container-engaging means on said one arm from the yaw axis is greater than the spacing of the container-engaging means on the other arms from the yaw axis, the container-engaging means on said other arms being equally spaced from the yaw axis.

12. The pick-up assembly of claim 9 in which said one arm is aligned with the roll axis and each of the other arms is generally L-shaped and includes an end portion which extends parallel with the roll axis in the direction opposite to the direction in which said one arm extends from the arm support member.

* * * * *